United States Patent
Aalaie Haradasht et al.

(10) Patent No.: US 8,247,488 B2
(45) Date of Patent: Aug. 21, 2012

(54) MODIFIED POLYACRYLAMIDE HYDROGEL

(75) Inventors: Jamal Aalaie Haradasht, Tehran (IR); Ebrahim Vasheghani Farahani, Tehran (IR); Ali Rahmatpour, Tehran (IR)

(73) Assignee: RIPI, Tehran (IR)

( * ) Notice: Subject to any disclaimer, the term of this patent is extended or adjusted under 35 U.S.C. 154(b) by 0 days.

(21) Appl. No.: 12/909,778

(22) Filed: Oct. 21, 2010

(65) Prior Publication Data

US 2012/0101229 A1 Apr. 26, 2012

(51) Int. Cl.
*C09B 67/00* (2006.01)

(52) U.S. Cl. ........ 524/502; 162/164.1; 166/294; 166/295; 507/211; 507/225; 516/77; 516/105; 523/130; 524/608; 525/54.2; 525/156; 525/186; 525/329.4; 525/370

(58) Field of Classification Search ........ 162/164.1; 166/294, 295; 525/54.2, 156, 186, 370, 329.4; 507/211, 225; 516/77, 105; 523/130; 524/502, 524/608

See application file for complete search history.

(56) References Cited

U.S. PATENT DOCUMENTS

| | | | |
|---|---|---|---|
| 4,337,328 A | 6/1982 | Holst et al. | |
| 4,606,407 A * | 8/1986 | Shu | 166/270 |
| 4,702,319 A | 10/1987 | Bock et al. | |
| 4,709,759 A | 12/1987 | Bock et al. | |
| 4,744,418 A * | 5/1988 | Sydansk | 166/270 |
| 4,974,677 A * | 12/1990 | Shu | 166/270 |
| 5,441,928 A | 8/1995 | Albonico et al. | |
| 6,358,580 B1 | 3/2002 | Mang et al. | |

FOREIGN PATENT DOCUMENTS

| | | |
|---|---|---|
| CN | 1464007 | 12/2003 |
| JP | 4045850 | 2/1992 |
| JP | 2004124065 | 4/2004 |

OTHER PUBLICATIONS

Nohata, Y.; Kurane, R.; Journal fo Fermentation and Bioengineering, 1996, vol. 82(1), p. 22-27.*

* cited by examiner

*Primary Examiner* — James J Seidleck
*Assistant Examiner* — Robert Jones, Jr.

(57) ABSTRACT

The invention relates to a salt resistant water absorbing compound including a polymeric phase that includes polyacrylamide and at least one of di or poly saccharide, wherein the polyacrylamide is cross-linked in the presence of at least one of di or poly saccharide by a cross-linking agent including multivalent cations, complexes thereof, organic cross-linking agents, or any combination thereof.

19 Claims, No Drawings

MODIFIED POLYACRYLAMIDE HYDROGEL

DESCRIPTION OF THE STATE OF THE ART

Polyacrylamides have a high average molecular weight and have ideal viscosity in dilute electrolyte solutions at low temperatures. Furthermore, polyacrylamides have good resistance to bacterial contamination. However, polyacrylamides hydrolyze at high temperatures and precipitate with polyvalent cations present in oil reservoir waters, losing their viscosity. In addition, bivalent cations (e.g., $Ca^{2+}$) lead to the syneresis of their hydrogels, loss of volume and water by increasing the number of cross-link points. However, the low cost of polyacrylamides has made them the preferred polymers for enhanced oil recovery processes, and hence, modification and increasing the efficiency thereof in harsh conditions is a major field of study.

U.S. Pat. No. 5,441,928 describes the application of water soluble acids to avoid the syneresis of polyacrylamides and/or copolymers thereof in the presence of bivalent cations, especially $Ca^{2+}$ and $Mg^{2+}$. The gel compound is yielded by mixing polyacrylamide and/or the copolymers thereof, aldehyde cross-linker and/or an aldehyde-phenol mixture and the acidic anti-syneresis agent. Such aldehyde and phenolic compounds are very toxic and the application of the anti-syneresis agents can be very costly.

U.S. Pat. No. 4,709,759 uses a tetra polymer, namely, NVP-HRAM (where AM: acryl amide, NVP: N-vinyl pyrrolidone, H: acrylic acid salt, R: a hydrophobic alkyl group). It is observed that NVP-HRAM has rather less sensitivity in comparison with hydrolyzed polyacrylamide. In fact, the presence of R leads to the reduction in the salt sensitivity of the gel compound. However, such gel compounds can be expensive and also difficult to prepare.

U.S. Pat. No. 4,702,319 describes the preparation of a terpolymer of acrylamide and the salt of an unsaturated ethylenic sulfonic acid, and an alkyl acrylamide as a water insoluble group. It is observed that presence of sodium 2-acryl amido 2-methyl propane sulfonate (AMPS) can improve the hydrolitic stability. However, such polymers are expensive and difficult to prepare.

U.S. Pat. No. 6,358,580 describes a method for preparing a sealing foam by mixing a rubber and a water sorbent (a polysaccharide and a water absorbing synthetic acrylic polymer) which swells in the presence of water. It is observed that the resulting compound swells 5-600% in the presence of water. However, there is no report about its swelling behavior in electrolyte solutions.

U.S. Pat. No. 4,337,328 describes a method for preparing water absorbing acrylic polymer by reacting polyacrylonitrile with an aqueous alkaline solution (which may contain a miscible organic solvent) at temperatures higher than 100° C. Polyacrylonitrile and/or its copolymers reduce to its swellable derivatives without using a cross-linking reagent or modifiers. The swelling tests of U.S. Pat. No. 4,337,328 are limited to low concentrations of NaCl.

CN 1464007 describes a method for preparing a hydrophile resin, which is resistant against salt and heat. The resin is a terpolymer of acrylic acid, acrylamide, cationic monomers and layer-structured inorganic compounds. The resin is applicable in the temperature range of 70-150° C. and 5,000-100,000 ppm of salts for long periods.

JP 4045850 describes the application of radical polymerization of water-soluble unsaturated ethylenic monomers containing amine groups (e.g. acrylamide and metacrylamide) and acrylic acid monomers to yield a water absorber capable of absorbing salts in solutions (especially those of bivalent solution).

JP 2004124065 describes a salt resistant-water absorbent for use in media with high concentrations of ions. The compound is a cross-linked copolymer of (a) N-alkoxymethyl metacrylate and (b) a cross-linking monomer (containing one or more vinyl groups) and one or more unsaturated ethylenic monomers that can copolymerize with a and b.

Most of the above-mentioned methods are based on the chemical modification of polyacrylamide. Among which the copolymerization of polyacrylamide with hydrolysis-resistant monomers is the most common. It is observed by experiments that the resistance of the resulting copolymer against the multivalent ions depends on the amount of such comonomers, which may make the product difficult to produce and very expensive. The difficulty of producing copolymers of proper molecular weights is another consideration.

In case of using other anti-syneresis agents, the efficiency is highly dependent on the amount of the agents in the media, precisely like the copolymers.

SUMMARY OF THE INVENTION

Embodiments of the present invention may provide a salt resistant water absorbing compound that includes a mixture of (A) polyacrylamide (PAM) and (B) one or a mixture of di or poly saccharides that are cross linked using a cross linking agent through interpenetrating polymeric network (IPN) method.

According to an embodiment of the present invention, the polyacrylamide can be anionic polyacrylamides including hydrolyzed polyacrylamides and/or co- and/or terpolymers thereof with carboxyl and/or sulfonated group and/or vinyl pyrrolidone and/or hydrophobe groups.

According to another embodiment of the present invention, the molecular weight of the PAM to be used in embodiments of the present invention is at least $0.5 \times 10^6$.

According to an embodiment of the present invention, the molecular weight of the PAM used in embodiments of the present invention may be from about $1 \times 10^6$ to about $3 \times 10^7$.

According to a particular embodiment of the present invention, the molecular weights of the PAM used in embodiments of the present invention may be from about $6 \times 10^6$ to about $2 \times 10^7$.

According to a particular embodiment of the present invention, in the case of using hydrolyzed polyacrylamides as the designed PAM component of the present invention, the hydrolysis ratio can be at least 3% by mole.

According to a particular embodiment of the present invention, the hydrolysis ratio of the hydrolyzed PAM can be from about 10 to about 35% by mole.

According a particular embodiment of the present invention, the hydrolysis ratio of the hydrolyzed PAM can be from about 15 to about 30% by mole.

According to another embodiment of the present invention, the di or poly saccharide can include: polysaccharides such as carboxymethyl cellulose, hydroxyethyl cellulose, starch, carrageenan(kC), sucrose disaccharide, and biopolymers containing the building block of glucose-rhamnose-fucose-glucuronic acid, or any combination thereof.

According to a particular embodiment of the present invention, the used di or poly saccharide is one or a mixture of B-16 biopolymer which contains the below repeated unit of {→3}-β-D-glucopyranosyl-(1→4)-β-D-glucuronic acid-(1→4)-β-D-glucopyranosyl-(1→4) α-L-rhamnopyranosyl-(1→4) nα-L-fucopyranosyl(1→3), and/or sucrose disaccharide.

According to particular embodiment of the present invention the used poly saccharide is the B-16 biopolymer, which contains the repeated unit of glucose-rhamnose-fucose-glucuronic acid as below: $\{\rightarrow 3\}$-$\beta$-D-glucopyranosyl-$(1\rightarrow 4)$-$\beta$-D-glucuronic acid-$(1\rightarrow 4)$-$\beta$-D-glucopyranosyl-$(1\rightarrow 4)$ $\alpha$-L-rhamnopyranosyl-$(1\rightarrow 4)$n$\alpha$-L-fucopyranosyl$(1\rightarrow 3)$ According to another embodiment of the present invention multivalent (metallic) cationic cross-linking agents and/or complexes therefore and/or organic cross linking agents are used to prepare the product of the present invention.

According to a particular embodiment of the present invention, multivalent cations like $Cr^{3+}$, $Al^{3+}$, $Zr^{3+}$, $Fe^{3+}$, and/or $Ti^{4+}$ and complexes thereof like chromium malonate, chromium acetate, chromium chloride, chromium nitrate, chromium propionate, zirconium lactate, zirconium acetate, titanium tartarate, titanium citrate, aluminum citrate, iron acetate, iron citrate, iron nitrate and organic cross-linking agents like phenol-formaldehyde, salicylamide-formaldehyde and/or phenol-hexamethylenetetramine and/or any other cross linking agent that can lead to the outcomes of the present invention.

According to some embodiments of the present invention, the total concentration of the polymeric phase in an aqueous reaction solution may be at least 4,000 ppm, for example, in the range of from about 4,500 ppm to about 15,000 ppm, such as in the range of from about 5,000 ppm to about 8,000 ppm.

According to another embodiment of the present invention, the mass ratio of B to the polymeric phase in an aqueous reaction solution may be at least 2 wt %.

According an embodiment of the present invention, the mass ratio of B to polymeric phase in an aqueous reaction solution may be from about 10 to about 85 wt %.

According to an embodiment of the present invention, the mass ratio of B to the polymeric phase in the reaction solution may be from about 15 to about 75 wt %.

According to another embodiment of the present invention, the concentration of the cross linking agent in the reaction solution may be at least 3 wt % of the polymeric phase, for example, from about 6 to about 20 wt % of the polymeric phase, such as from about 7 to about 15 wt %.

According to an embodiment of the present invention, a method of preparing the compound of the present invention includes separately mixing polyacrylamide and the di or poly saccharide with water to achieve a polymeric mixture having a predetermined concentration of polyacrylamide and the di or poly saccharide and adding a cross-linking agent to the polymeric mixture for a predetermined time and at a predetermined temperature to create the salt resistant water absorbing compound of the present invention.

DETAILED DESCRIPTION

The present invention is directed to a salt resistant water absorbing compound and method for making the same. Additionally, the salt resistant water absorbing compound includes high anti-syneresis characteristics even at high temperatures.

The salt resistant water absorbing compound of the present invention can include a polymeric phase that can include a polyacrylamide and a di or poly saccharide. The polyacrylamide can be cross-linked in the presence of the di or poly saccharide by a cross-linking agent (Please note that during this process the di or poly saccharide is trapped between the cross linked polyacrylamide and is not cross linked with them itself—this is what is technically named as IPN). This cross-linking agent can be multivalent cations, complexes thereof, organic cross-linking agents, or any combination thereof.

The polyacrylamide of the present invention can be an anoionic polyacrylamide that includes, but not limited to, hydrolyzed polyacrylamides, co- and/or terpolymers thereof with carboxyl and/or sulfonated group and/or vinyl pyrrolidone and/or hydrophobe groups, or any combination thereof.

According to an embodiment of the present invention, molecular weights of the polyacrylamides is at least $0.5\times 10^6$, for example, from about $1.0\times 10^6$ to about $3.0\times 10^7$ or from about $6.0\times 10^6$ to about $2.0\times 10^7$.

In an embodiment of the present invention, wherein the anionic polyacrylamide is a hydrolyzed polyacrylamide, the hydrolysis ratio of the hydrolyzed polyacrylamide can be at least 3% by mole, for example the hydrolysis ratio can be from about 10% to about 35% by mole, or from about 15% to about 30% by mole.

The di or poly saccharide of the present invention can be: polysaccharides such as carboxymethyl cellulose, hydroxyethyl cellulose, starch, carrageenan, sucrose, biopolymers including building block of glucose-rhamnose-fucose-glucuronic acid, or any combination thereof.

In an embodiment of the present invention, the di or poly saccharide can be a sucrose, a biopolymer having a chemical structure $\{\rightarrow 3\}$-$\beta$-D-glucopyranosyl-$(1\rightarrow 4)$-$\beta$-D-glucuronic acid-$(1\rightarrow 4)$-$\beta$-D-glucopyranosyl-$(1\rightarrow 4)$ $\alpha$-L-rhamnopyranosyl-$(1\rightarrow 4)$n$\alpha$-L-fucopyranosyl$(1\rightarrow 3)$, or a combination thereof. One specific example of the biopolymer of the present invention is B-16 biopolymer.

As stated above, the cross linking agent can be multivalent cations, complexes thereof, organic cross-linking agents, or any combination thereof. Exemplary multivalent cationic cross-linking agents that can be used to cross-link polyacrylamide and biopolymer of the present invention include, but are not limited to, $Cr^{3+}$, $Al^{3+}$, $Zr^{3+}$, $Fe^{3+}$, $Ti^{4+}$, their complexes thereof, or any combination thereof. Exemplary organic cross-linking agents that can be used to cross link polyacrylamide and biopolymer of the present invention include, but are not limited to, phenol-formaldehyde, salicylamide-formaldehyde, phenol-hexamethylenetetramine, or any combination thereof.

In one embodiment, $Cr^{3+}$ complexes that can be used in the present invention include, but are not limited to, chromium malonate, chromium acetate, chromium chloride, chromium nitrate, chromium propionate. In another example, $Zr^{3+}$ complexes that can be used in the present invention include, but are not limited to, zirconium lactate, zirconium acetate. Additionally, example of $Ti^{4+}$ complexes that can be used in the present invention include, but are not limited to, titanium tartarate, titanium citrate and example of $Al^{3+}$ complexes that can be used in the present invention include, but are not limited to, aluminum citrate. Example of $Fe^{3+}$ complexes that can be used in the present invention include, but are not limited to, iron acetate, iron citrate, iron nitrate. Preferably, the cross-linking agent that is capable of cross-linking the polyacrylamide in the presence of the di or poly saccharide of the present invention is chromium malonate, chromium acetate, zirconium acetate, or any combination thereof.

In one embodiment, the total concentration of the polymeric phase in an aqueous reaction solution is at least 4000 ppm, for example from about 4500 to about 15000 ppm or from about 5000 to about 8000 ppm.

A method of making the salt resistant water absorbing compound of the present invention includes mixing tap water with polyacrylamide and di or poly saccharide to achieve a polymeric mixture having a predetermined concentration of polyacrylamide and di or poly saccharide and adding a sufficient amount of the cross-linking agent to the polymeric mixture for a predetermined time and at a predetermined temperature.

In one embodiment of the present invention, the mass ratio of the di or poly saccharide to the polymeric phase in an aqueous reaction solution is at least 2 wt %, for example from about 10 wt % to about 85 wt % or from about 15 wt % to about 75 wt %.

Tap water can include dissolved salt concentration (TDS) of about 4500 ppm or less, for example, from about 500 ppm to about 4000 ppm, such as from about 1,000 ppm to about 2500 ppm. Exemplary tap water compositions are shown in Table 1, but other solution of other compositions can also be used for this purpose.

TABLE 1

Compositions of Tap and Oil Reservoir Formation Water

| | Ion Concentrations (mg/L) | |
|---|---|---|
| Ion Type | Oil Reservoir Formation Water | Tap Water |
| $Ca^{2+}$ | 12800 | 115 |
| $Mg^{2+}$ | 880 | 73 |
| $Na^+$ | 61800 | 300 |
| $K^+$ | 810 | 6.1 |
| $HCO_3^-$ | 63 | 542 |
| $SO_4^{2-}$ | 142 | 395 |
| $Cl^-$ | 156000 | 276 |

The cross-linking agent can then be added to the polymeric mixture in a sufficient amount to achieve a homogenous phase. For example, the concentration of the cross-linking agent in the aqueous reaction solution is at least 3 wt % of the polymeric phase, such as from about 6 wt % to about 20 wt % of the polymeric phase or from about 7 wt % to about 15 wt % of the polymeric phase.

The polymeric mixture and the cross-linking agent are then stirred for 30 minutes or more, for example from about 45 minutes to about 5 hours, such as from about 1 hour to about 3 hours.

In one embodiment, a mixer having a momentum controller is used to stir the polymeric mixture and the cross-linking agent in a water bath having a temperature sufficient to allow the cross-linking agent to react with polymeric mixture to form a hydrogel through interpenetrating polymeric network (IPN) method. In one embodiment, the temperature of the water bath is at least 65° C., for example, from about 70 to about 95° C., such as from about 75 to about 85° C. Particularly, the reaction between the polymeric mixture and the cross-linking agent may continue until the momentum of the reaction is substantially constant.

In one embodiment, the mixer is capable of stirring the polymeric mixture and the cross-linking agent at a rate of 80 rpm or less, for example, from about 10 rpm to about 50 rpm, such as from about 12 rpm to about 40 rpm.

The formed hydrogel can be purified by placing it in water for 4 days or more, for example, from about 5 days to about 15 days, such as from about 7 days to about 10 days. The purified hydrogel can then be dehydrated using ethanol and then dried in an oven. Particularly, the purified hydrogel may be dried at a temperature of 70° C. or less, for example, from about 35 to about 65° C., such as from about 40 to about 55° C. for 24 hours or more, for example, from about 36 to about 120 hours, such as from about 48 to about 96 hours.

The dried gels may be stored in desiccators and kept away from light before being tested for their swelling behavior. The equilibrium swelling ratio (ESR) may be calculated through the below equation:

$$ESR(g/g) = \frac{w - wo}{wo} \qquad \text{Eq. (1)}$$

Where w is the swollen sample weight and wo is the dry sample weight.

The swelling tests were performed using water and also salt solutions of different concentrations.

The test results revealed that the hydrogel of the present invention exhibited stability in the presence of water having 400,000 ppm of TDS or less, and particularly stable in water having from about 100,000 ppm to about 350,000 ppm of TDS, and more preferably stable in water having from about 150,000 ppm to about 300,000 ppm of TDS.

Additionally, the test results indicated that the hydrogel of the present invention exhibited thermal stability at temperatures of 95° C. or less, for example, from about 15 to about 90° C., such as from about 25 to about 85° C.

Anti-syneresis tests were performed using an oven in the presence of oil reservoir formation water. To perform these tests, solutions of polyacrylamide and saccharide were separately prepared in oil reservoir formation water (Table 1) and mixed with each other in predetermined ratios. A difference between the preparation method and that described above was the composition of the water used. Volume of the hydrogels in test tubes was between 14 to 20 ml (Please note that this not an example and is rather the overall procedure for anti-syneresis tests)

Resistance against syneresis of the formulations was calculated by comparing the gel volume, during the test, to the initial gel volume.

It should be recognized that the examples below are provided to aid a general understanding of the invention; and the scope of the invention is not limited to the content of the examples.

EXAMPLE 1

The IPN hydrogel with a composition of 70/30 of a hydrolyzed polyacrylamide with a molecular weight of $16 \times 10^6$ and hydrolysis degree of 20-25% by mole and sucrose with a molecular weight of 342.3 and purity of 98% was prepared in tap water as described above.

A solution of the cross-linking agent of chromium triacetate was added to the polymeric solution and the mixture was homogenized by a stirrer equipped with a momentum indicator.

The stirring time was about 3 hours, the total polymer phase concentration was 5,000 ppm and the cross-linking agent concentration was 8 wt % of the polymeric phase. The cross-linking reaction was performed in a water bath having a temperature of from about 75 to about 80° C. and the reaction time was determined by the moment of the solution as was shown by the moment indicator of the stirrer having a rate of 14 rpm.

The synthesized hydrogels were purified by being immersed in water for 7 to 10 days before being dehydrated by ethanol and dried at a temperature of about 45° C. for approximately 96 hours. The resulting product was kept in a desiccator and away from light.

The ESR of the samples in oil reservoir formation water (having salt concentrations as indicated in Table 1) and in 0.15 M solutions of $CaCl_2$ were evaluated using Eq. (1). The results are shown in Table 2.

TABLE 2

Equilibrium Swelling Ratios of Prepared IPN Hydrogels

| Example | Equilibrium Swelling Ratio in 0.15M $CaCl_2$ | Equilibrium Swelling Ratio in Formation Water |
|---|---|---|
| 1 | 12.02 | 21.13 |
| 2 | 21.50 | 24.13 |
| 3 | 15.70 | 17.30 |
| 4 | 11.50 | 20.6 |

EXAMPLE 2

An IPN hydrogel with a composition of 70/30 of a hydrolyzed polyacrylamide having a molecular weight of $16 \times 10^6$ and hydrolysis degree of from about 20 to about 25% by mole and the B-16 biopolymer was prepared according to the method described in Example 1. The ESR of the products was tested in oil reservoir formation water and 0.15 M $CaCl_2$ solution. The results are shown in Table 2.

EXAMPLE 3 (COMPARATIVE EXAMPLE)

An IPN hydrogel with a composition of 70/30 of a hydrolyzed polyacrylamide having a molecular weight of $16 \times 10^6$ and hydrolysis degree of from about 20 to about 25% by mole and the polysaccharide xanthane was prepared according to the method described in Example 1. The ESR of the products was tested in oil reservoir formation water and 0.15 M $CaCl_2$ solution. The results are shown in Table 2.

EXAMPLE 4 (COMPARATIVE EXAMPLE)

A hydrogel with a composition of 100 wt % of hydrolyzed polyacrylamide having a molecular weight of $16 \times 10^6$ and hydrolysis degree of from about 20 to about 25% by mole was prepared according to the method described in Example 1. The ESR of the products was tested in oil reservoir formation water and 0.15 M $CaCl_2$ solution. The results are shown in Table 2. It is observed that IPN hydrogel containing polyacrylamide/B16 biopolymer has a superior swelling behavior to that of pure polyacrylamide hydrogel.

EXAMPLE 5

An IPN hydrogel with a composition of 70/30 of a hydrolyzed polyacrylamide having a molecular weight of $16 \times 10^6$ and hydrolysis degree of from about 20 to about 25% by mole and the B-16 biopolymer was prepared according to the method described in Example 1. The total concentration of the cross linking agent (chromium triacetate) was 700 ppm and that of the polymeric phase was 5,000 ppm. To prepare the formulations, a solution of each component in formation water was prepared separately, and the cross-linking agent solution was added to the polymeric solution. The solution was stirred for one (1) hour. Fifteen (15) mL of the prepared solution was added to a test tube and sealed before being put in an oven of 75° C. of temperature. The thermal stability of the samples in oil reservoir formation water at 75° C. together with those of other samples is reported in Table 3.

TABLE 3

Syneresis Degree of IPN Hydrogels in Oil Reservoir Formation Water at 75° C.

| Example No. | Syneresis Degree (%) after 16 Days | Syneresis Degree (%) after 30 Days | Syneresis Degree (%) after 120 Days |
|---|---|---|---|
| 5 | 2.7 | 5 | 7 |
| 6 | 10 | 45 | 98 |
| 7 | 65 | 81 | 98 |
| 8 | 5.5 | 27 | 85 |
| 9 | 90 | 95.5 | 97 |

EXAMPLE 6 (COMPARATIVE EXAMPLE)

A hydrogel with a composition of 100 wt % of a hydrolyzed polyacrylamide of a molecular weight of $16 \times 10^6$ and hydrolysis degree of from about 20 to about 25% by mole was prepared in formation water. The concentration and type of cross-linking agents were substantially identical to those in Example 5. The thermal stability of the samples in formation water at 75° C. together with those of the other samples is reported in Table 3.

EXAMPLE 7 (COMPARATIVE EXAMPLE)

An IPN hydrogel with a composition of 70/30 of a hydrolyzed polyacrylamide of a molecular weight of $16 \times 10^6$ and hydrolysis degree of from about 20 to about 25% by mole and the polysaccharide xanthane was prepared in formation water. All other parameters were substantially identical to those in Example 5. The thermal stability of the samples in formation water at 75° C. together with those of other samples is reported in Table 3.

EXAMPLE 8

An IPN hydrogel with a composition of 70/30 of a hydrolyzed polyacrylamide of a molecular weight of $16 \times 10^6$ and hydrolysis degree of from about 20 to about 25% by mole and the disaccharide sucrose was prepared in formation water. All other parameters were substantially identical to those in Example 5. The thermal stability of the samples in formation water at 75° C. together with those of other samples is reported in Table 3.

EXAMPLE 9 (COMPARATIVE EXAMPLE)

Hydrogels with a composition of 100 wt % of a hydrolyzed polyacrylamide of a molecular weight of $16 \times 10^6$ and hydrolysis degree of from about 20 to about 25% by mole was prepared in the presence of 0.025M acetic acid solution. All other parameters were substantially identical to those in Example 5. The thermal stability of the sample in formation water at 75° C. together with those of other samples is reported in Table 3.

As it is shown in Table 3, even after 16 days the observed behavior of some samples was substantially unchanged, while pure polyacrylamide, polyacrylamide/xanthane IPN, or citric acid-polyacrylamide exhibited marked syneresis. This is, as indicated above, minimal in polyacrylamide/B-16 and polyacrylamide/sucrose samples after 16 days. This observed trend continued even after 120 days. The significant syneresis among the pure polyacrylamide, polyacrylamide/xanthane, and polyacrylamide-citric acid sample can be associated with the increase in the number of cross-linkages as a result of forming ionic bound with multivalent species in water and the anionic groups in the sample.

Except for the polyacrylamide/xanthane IPN, the syneresis results in oil formation water for the two other samples are the same as ESR results.

Although the polyacrylamide/xanthane IPN shows a good swelling behavior in water at room temperature, its behavior at 75° C. in oil formation water is below what may be deemed as acceptable for specified uses. This may be related to xanthane losing its structural form at high temperatures in the presence of high concentrations of salts.

What is claimed is:

1. A salt resistant water absorbing compound comprising:
a polymeric phase comprising a polyacrylamide and at least one poly saccharide comprising a structure $\{\rightarrow3\}$-$\beta$-D-glucopyranosyl-$(1\rightarrow4)$-$\beta$-D-glucuronic acid-$(1\rightarrow4)$-$\beta$-D-glucopyranosy 1-$(1\rightarrow4)$ $\alpha$-L-rhamnopyranosyl-$(1\rightarrow4)$n$\alpha$-L-fucopyranosyl$(1\rightarrow3)$, wherein the polyacrylamide is cross-linked in the presence of the at least one poly saccharide by a cross-linking agent including multivalent cations, complexes thereof, organic cross-linking agents, or any combination thereof.

2. The salt resistant water absorbing compound of claim 1, wherein the polyacrylamide is an anionic polyacrylamide comprising hydrolyzed polyacrylamides, copolymers of anionic polyacrylamide, terpolymers of anionic polyacrylamide with carboxyl, sulfonate, hydrophobic groups, vinyl pyrrolidone, or any combination thereof.

3. The salt resistant water absorbing compound in claim 1, wherein the molecular weights of the polyacrylamide is at least $0.5\times10^6$.

4. The salt resistant water absorbing compound in claim 1, wherein the molecular weights of the polyacrylamide is from about $1.0\times10^6$ to about $3.0\times10^7$.

5. The salt resistant water absorbing compound in claim 1, wherein the molecular weights of the polyacrylamide is from about $6.0\times10^6$ to about $2.0\times10^7$.

6. The salt resistant water absorbing compound in claim 2, wherein the hydrolyzed polyacrylamide includes a hydrolysis ratio of at least 3% by mole.

7. The salt resistant water absorbing compound in claim 2, wherein the hydrolyzed polyacrylamide includes a hydrolysis ratio of from about 10% to about 35% by mole.

8. The salt resistant water absorbing compound in claim 2, wherein the hydrolyzed polyacrylamide includes a hydrolysis ratio of from about 15% to about 30% by mole.

9. The salt resistant water absorbing compound in claim 2, wherein the at least one poly saccharide is B-16 biopolymer.

10. The salt resistant water absorbing compound in claim 1, wherein the organic cross-linking agent comprises phenol-formaldehyde, salicylamide-formaldehyde, phenol-hexamethylenetetramine, or any combination thereof, and wherein the multivalent cationic cross-linking agent comprises $Cr^{3+}$, $Al^{3+}$ $Zr^{3+}$, $Fe^{3+}$, $Ti^{4+}$, their complexes thereof, or any combination thereof.

11. The salt resistant water absorbing compound in claim 10, wherein the $Cr^{3+}$ complexes include chromium malonate, chromium acetate, chromium chloride, chromium nitrate, chromium propionate, wherein the $Zr^{3+}$ complexes include zirconium lactate, zirconium acetate, wherein the $Ti^{4+}$ complexes include titanium tartarate, titanium citrate, and wherein the $Al^{3+}$ complexes include aluminum citrate, wherein the $Fe^{3+}$ complexes include iron acetate, iron citrate, iron nitrate.

12. The salt resistant water absorbing compound in claim 1, wherein the cross-linking agent is chromium malonate, chromium acetate, zirconium acetate, or any combination thereof.

13. The salt resistant water absorbing compound in claim 1, further comprising an aqueous reaction solution, wherein total concentration of the polymeric phase in the aqueous reaction solution is at least about 4000 ppm, and the concentration of the cross-linking agent in the aqueous reaction solution is at least about 3 wt % of the polymeric phase.

14. The salt resistant water absorbing compound in claim 1, further comprising an aqueous reaction solution, wherein total concentration of the polymeric phase in the aqueous reaction solution is from about 4500 to about 15000 ppm, and the concentration of the cross-linking agent in the aqueous reaction solution is from about 6 wt % to about 20 wt % of the polymeric phase.

15. The salt resistant water absorbing compound in claim 1, further comprising an aqueous reaction solution, wherein total concentration of the polymeric phase in the aqueous reaction solution is from about 5000 to about 8000 ppm, and the concentration of the cross-linking agent in the aqueous reaction solution is from about 7 wt % to about 15 wt % of the polymeric phase.

16. The salt resistant water absorbing compound in claim 1, further comprising an aqueous reaction solution, wherein the mass ratio of the at least one poly saccharide to the polymeric phase in the aqueous reaction solution is at least about 2 wt %.

17. The salt resistant water absorbing compound in claim 1, further comprising an aqueous reaction solution, wherein the mass ratio of the at least one poly saccharide to the polymeric phase in the aqueous reaction solution is from about 10 wt % to about 85 wt %.

18. The salt resistant water absorbing compound in claim 1, further comprising an aqueous reaction solution, wherein the mass ratio of the at least one poly saccharide to the polymeric phase in the aqueous reaction solution is from about 15 wt % to about 75 wt %.

19. A method for preparing the salt resistant water absorbing compound of claim 1 comprising:
mixing water with polyacrylamide and at least one poly saccharide comprising a structure $\{\rightarrow3\}$-$\beta$-D-glucopyranosyl-$(1\rightarrow4)$-$\beta$-D-glucuronic acid-$(1\rightarrow4)$-$\beta$-D-glucopyranosy 1-$(1\rightarrow4)$ $\alpha$-L-rhamnopyranosyl-$(1\rightarrow4)$n$\alpha$-L-fucopyranosyl$(1\rightarrow3)$ to achieve a polymeric mixture having a predetermined concentration of polyacrylamide and at least one poly saccharide; and
adding the cross-linking agent to the polymeric mixture for a predetermined time and at a predetermined temperature.

* * * * *